United States Patent
Odell et al.

(10) Patent No.: US 7,069,448 B2
(45) Date of Patent: Jun. 27, 2006

(54) CONTEXT ORIENTED CRYPTO PROCESSING ON A PARALLEL PROCESSOR ARRAY

(75) Inventors: Mark A. Odell, Ashburn, VA (US); Edward Scheidt, McLean, VA (US); C. Jay Wack, Clarksburg, MD (US)

(73) Assignee: Tecsec, Inc., Vienna, VA (US)

( * ) Notice: Subject to any disclaimer, the term of this patent is extended or adjusted under 35 U.S.C. 154(b) by 732 days.

(21) Appl. No.: 10/310,644

(22) Filed: Dec. 5, 2002

(65) Prior Publication Data

US 2003/0174843 A1  Sep. 18, 2003

Related U.S. Application Data

(60) Provisional application No. 60/337,530, filed on Dec. 5, 2001.

(51) Int. Cl.
*H04L 9/00* (2006.01)

(52) U.S. Cl. ............................. 713/189; 726/3; 726/13
(58) Field of Classification Search ................. 713/189
See application file for complete search history.

(56) References Cited

U.S. PATENT DOCUMENTS

| | | | | |
|---|---|---|---|---|
| 5,539,891 | A * | 7/1996 | Childers et al. ................ 711/5 |
| 5,978,373 | A * | 11/1999 | Hoff et al. ................... 370/392 |
| 6,112,181 | A * | 8/2000 | Shear et al. .................... 705/1 |
| 6,157,648 | A * | 12/2000 | Voit et al. .................... 370/401 |
| 6,219,707 | B1 * | 4/2001 | Gooderum et al. .......... 709/225 |
| 6,263,445 | B1 * | 7/2001 | Blumenau ....................... 726/2 |
| 6,363,488 | B1 * | 3/2002 | Ginter et al. ................... 726/1 |
| 6,366,578 | B1 * | 4/2002 | Johnson ...................... 370/353 |
| 6,757,710 | B1 * | 6/2004 | Reed ........................... 709/203 |
| 6,807,580 | B1 * | 10/2004 | Freeman et al. ............. 709/249 |
| 2002/0194501 | A1 * | 12/2002 | Wenocur et al. ............. 713/201 |
| 2004/0025052 | A1 * | 2/2004 | Dickenson ................... 713/201 |

* cited by examiner

*Primary Examiner*—Kambiz Zand
(74) *Attorney, Agent, or Firm*—IP Strategies

(57) ABSTRACT

A system provides cryptographic processing of input data on a parallel processor array that includes plural processors. A format filter extracts control and main data from the input data. A control unit receives the control data, and based on the control data, forwards control and cryptographic parameters to the processors. A first distributor distributes to each processor at least a portion of the main data. A second distributor receives output information from each processor, and based thereon, generates output data. Each processor generates output information based on the control and cryptographic parameters. The output data is a cryptographic processing result.

18 Claims, 3 Drawing Sheets

CONTEXT ORIENTED CRYPTO PROCESSING ON A PARALLEL PROCESSOR ARRAY

CROSS-REFERENCE TO RELATED APPLICATIONS

This disclosure claims the priority benefit of, and incorporates by reference in its entirety, U.S. provisional patent application Ser. No. 60/337,530, filed on Dec. 5, 2001. Additionally, this disclosure is related to the following co-pending U.S. patent applications: U.S. patent application Ser. No. 09/023,672, entitled "Cryptographic Key Split Combiner," filed on Feb. 13, 1998 by SCHEIDT et al.; Ser. No. 09/874,364, entitled "Cryptographic Key Split Combiner," filed on Jun. 6, 2001 by SCHEIDT et al.; Ser. No. 09/917,795, entitled "Cryptographic Key Split Combiner," filed on Jul. 31, 2001 by SCHEIDT et al.; Ser. No. 09/917,794, entitled "Cryptographic Key Split Combiner," filed on Jul. 31, 2001 by SCHEIDT et al.; Ser. No. 09/917,802, entitled "Cryptographic Key Split Combiner," filed on Jul. 31, 2001 by SCHEIDT et al.; Ser. No. 09/917,807, entitled "Cryptographic Key Split Combiner," filed on Jul. 31, 2001 by SCHEIDT et al.; Ser. No. 09/992,529, entitled "Cryptographic Key Split Combiner," filed on Nov. 20, 2001 by SHEIDT et al.; Ser. No. 10/147,433, entitled "Cryptographic Key Split Binding Process and Apparatus," filed on May 16, 2002 by SCHEIDT et al.; Ser. No. 09/205,221, entitled "Access Control and Authorization System," filed on Dec. 4, 1998 by SCHEIDT et al.; and Ser. No. 10/278,765, entitled "Access Control and Authorization," filed on Oct. 22, 2002 by SCHEIDT et al.

FIELD OF THE INVENTION

The present invention relates to cryptographic processing, parallel processing, and parallel cryptographic processing. More specifically, the present invention relates to context-oriented cryptographic processing in a parallel processing environment.

BACKGROUND OF THE INVENTION

Cryptography has been used as a means to protect electronic information from unauthorized alteration, manipulation and access. From Internet transactions to mobile telephone communications to database management, the frequency and importance of data storage and communication have grown exponentially in recent years.

As the importance of data storage and communications have grown, computer security has become equally important to safe guard sensitive data and to limit access to computer resources to authorized individuals. With the increased importance of computer security, security-based measures have also grown in complexity and strength. Due to increased complexities, the costs associated with effectuating cryptographic schemes have also grown. In particular, processing resources can be adversely affected when complex cryptographic schemes are employed.

Further, as larger amounts of electronic information are cryptographically secured, processing resources can also be adversely affected when cryptographic schemes are employed, and can be further adversely affected when the cryptographic schemes are complex.

Cryptographic schemes have been applied to parallel processing environments to increase necessary processing resources, as well as to provide processing efficiency. However, there remains a need for an efficient manner of effectuating cryptographic processing in a parallel processing environment. There additionally remains a need for a context-oriented manner of facilitating cryptographic processing in a parallel processing environment.

BRIEF SUMMARY OF THE INVENTION

The present invention provides cryptographic processing of input data in a parallel processing environment, and can be employed in myriad applications. For example, the present invention can be applied to telecommunications cryptographic processing on trunk lines. Further, the present invention can provide fine granularity cryptographic separation between virtual circuits in a trunk. Also, the present invention can be applied to Asynchronous Transfer Mode ("ATM") virtual circuits ("VCs"), hierarchical framing structures in a Synchronous Optical Network ("SONET"), and transaction threads to a database.

In an exemplary embodiment, the present invention can be embodied in a system for cryptographic processing of input data on a parallel processor array that includes a plurality of processors, and includes: a format filter, a control unit, a first distributor, and a second distributor. The format filter extracts control data and main data from the input data, while the control unit receives the control data from the format filter, and forwards, based at least in part on the control data, at least one respective control parameter and at least one respective cryptographic parameter to each of the plurality of processors. The first distributor, such as a switching matrix, for example, receives the main data from the format filter, and distributes to each of the plurality of processors a respective at least a portion of the main data. The second switching matrix, such as a switching matrix, for example, receives respective output information from each of the plurality of processors, and generates, based at least in part on the respective output information, output data. Each processor generates its respective output information based at least in part on its at least one respective control parameter and its at least one respective cryptographic parameter. The output data can be a cryptographic processing result.

The following are exemplary aspects of the present invention:

The control unit can be further adapted to provide state data that represents a particular state of the processor array. The main data can be encrypted data, while the output data can be unencrypted data. Likewise, the main data can be unencrypted data, while the output data can be encrypted data.

Further, each respective at least a portion of the main data can be a multiplexed process stream. Moreover, each of the plurality of processors can initialize based at least in part on the at least one respective control parameter received from the control unit. Also, each of the plurality of processors can perform a cryptographic function based at least in part on the at least one respective cryptographic parameter received from the control unit.

Additionally, the at least one respective cryptographic parameter can be keying data. And further, at least one of the first distributor and the second distributor can be a switching matrix.

In another exemplary embodiment, the present invention can be embodied in a method of cryptographically processing input data in a system comprising a parallel processor array having a plurality of processors. Accordingly, the method can include acts of extracting, from the input data, control data and main data; forwarding, based at least in part on the control data, at least one respective control parameter and at least one respective cryptographic parameter to each of the plurality of processors; distributing to each of the plurality of processors a respective at least a portion of the main data; generating, by each of the plurality of processors, respective output information based at least in part on the at least one respective control parameter and the at least one respective cryptographic parameter; and generating output data based at least in part on the respective output information. The output data can be a cryptographic processing result.

The following are further exemplary aspects of the present invention:

The method can further include providing state data representative of a state of the processor array. The main data can be encrypted data, while the output data can be unencrypted data. Likewise, the main data can be unencrypted data, while the output data can be encrypted data.

Further, each respective at least a portion of the main data can be a multiplexed process stream.

The method can further include initializing, by each of the plurality of processors, based at least in part on the at least one respective control parameter. The method can further include performing, by each of the plurality of processors, a cryptographic function based at least in part on the at least one respective cryptographic parameter. Additionally, the at least one respective cryptographic parameter can be keying data.

BRIEF DESCRIPTION OF THE DRAWINGS

The present invention is illustrated by way of example and not in limitation in the figures of the accompanying drawings, in which.

DETAILED DESCRIPTION OF THE INVENTION

Figure 1:
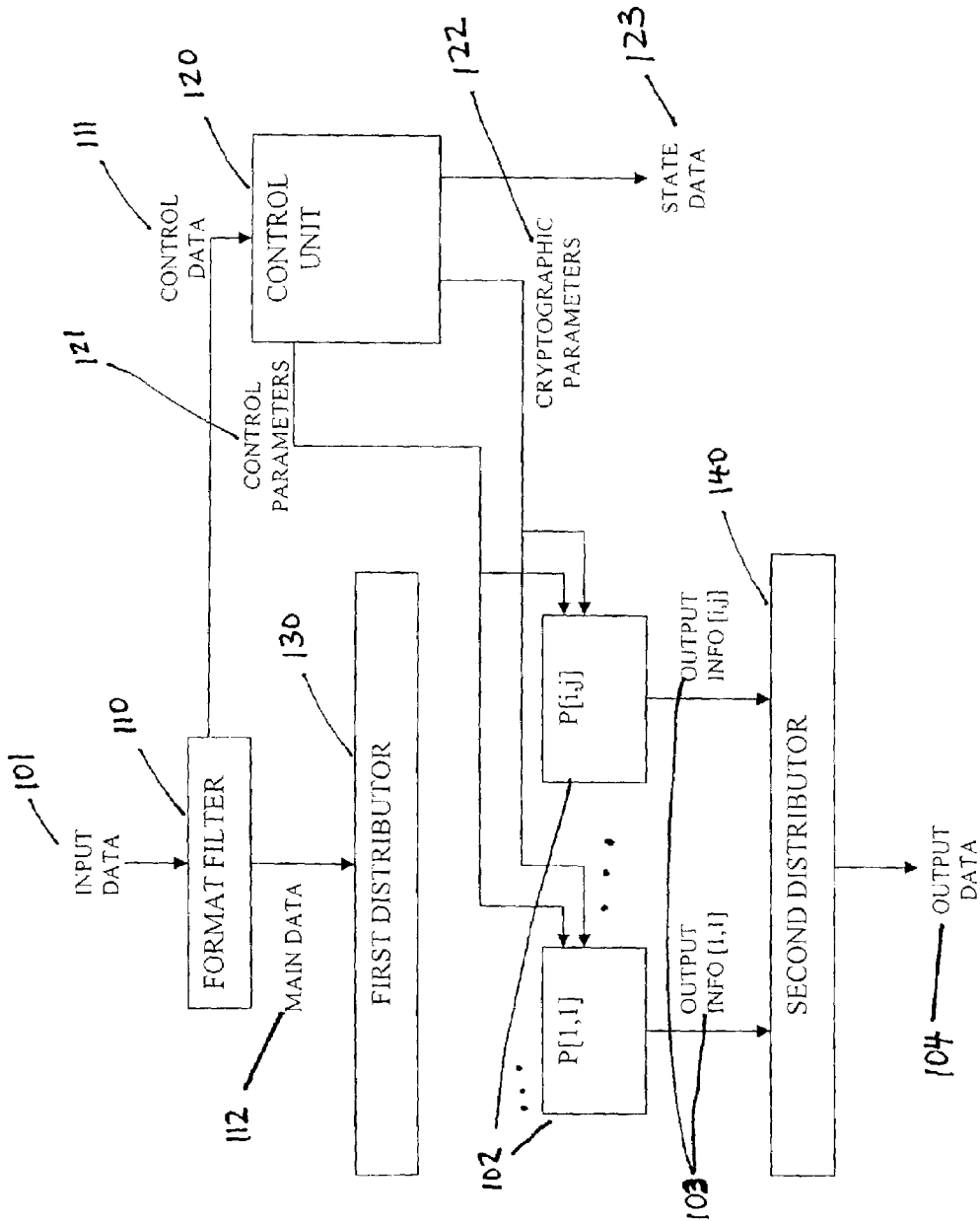
FIG. 1 illustrates an exemplary embodiment of the present invention, in which a system includes a format filter, a control unit, a switching matrix, and an inverse matrix.

Initial reference is made to FIG. 1, which illustrates a system according to an exemplary embodiment of the present invention. As shown in FIG. 1, a system for cryptographic processing of input data 101 on a parallel processor array that includes a plurality of processors 102, can include the following: a format filter 110, a control unit 120, a first distributor 130, and a second distributor 140. Illustratively, input data 101 can be based on any of a plurality of data structures, such as, for example, an ATM cell structure, hierarchical framing structure in SONET, or transaction threads for a database.

Format filter 110 can be adapted to extract control data 111 and main data 112 from input data 101. Thus, control data 111 is contained within input data 101, and can be formatted within a header structure thereof, for example. Control data 111 is used for encryption or decryption, which is further described below.

Where main data 112 is unencrypted data, control data 111 is utilized in the encryption of main data. Thus, control data 111 can be used to drive control and cryptographic functions for the encryption of main data 112. For example, here, control data 111 can include framing information relevant to bundled sub-threads or virtual circuits and sessions in an input stream.

Where main data 112 is encrypted data, control data 111 is utilized in the decryption of main data. Accordingly, control data 111 can be used to drive the control and cryptographic functions of the system. For example, here, control data 111 can include at least one cryptographic credential. A cryptographic credential defines one or more access levels. Thus, through the inclusion of at least one credential contained in control data 111, the control data can be used for encryption or decryption within the system.

For example, as described in U.S. patent application Ser. No. 09/205,221, entitled "Access Control and Authorization System," filed on Dec. 4, 1998 by SCHEIDT et al., a cryptographic credential can include a user's or entity's assigned permissions to labels and algorithms (such as, for example, one or more key splits, passwords, seed data instances, or other cryptographic parameters). As a further example, a credential can be encrypted, with a system password, for example, to improve security.

As further shown in FIG. 1, control unit 120 provides the parallel cryptographic processing initialization of processors 102 based on control data 111, which is received from format filter 110. For example, initialization can be for various modes of cryptographic functionality, algorithms, key management parameters, and matrix configuration. Thus, based at least in part on control data 111, control unit 120 provides at least one respective control parameter 121 and at least one respective cryptographic parameter 122 to each of the plurality of processors 102, which allows the initialization. Further, control unit 120 can additionally provide state data 123 that represents a particular state of the system at a particular point in time.

First distributor 130 receives main data 112 from format filter 110, and distributes a respective at least a portion of main data 112 to each of the processors 102. Thus, each of the processors 102 is provided respective data upon which to perform a portion of the cryptographic workload relating to the particular cryptographic function employed. Upon respective cryptographic processing, each of processors 102 provide output information 103 to second distributor 140.

As also shown in FIG. 1, second distributor 140 receives respective output information 103 from processors 102, and based at least in part thereon, generates output data 104, which is the result of the parallel cryptographic processing. Thus, first and second distributors 130, 140 multiplex main data 112 into streams or threads according to the particular parallel processing scheme employed. Further, for example, first and second distributors 130, 140 can operate in a pair-wise mode to preserve the integrity of input data 101.

Figure 2:
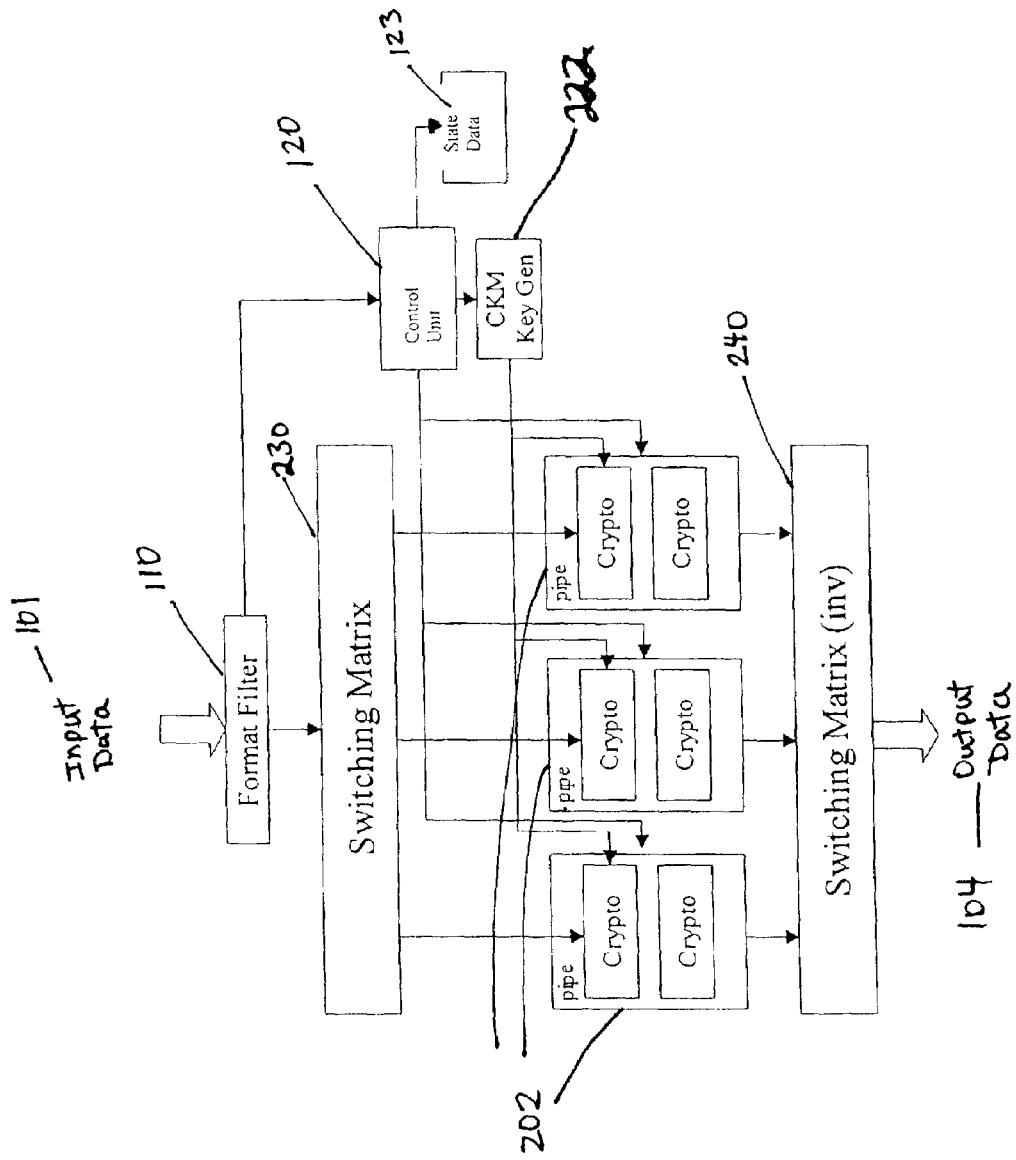
FIG. 2 illustrates another exemplary embodiment of the present invention, in which a system includes a format filter, a control unit, a first distributor, and a second distributor.

Reference is now made to FIGS. 1 and 2. FIG. 2 illustrates additional exemplary aspects of the present invention. As shown in FIG. 2, first distributor (shown in FIG. 1) can be a switching matrix 230, for example; and second distributor 140 can be switching matrix (inv) or inverse switching matrix 240. As shown in FIG. 2, the system can further include a cryptographic key generator 222 that generates the at least one respective cryptographic parameter 122 based at least in part on control data 111, and provides the generated at least one respective cryptographic parameter to each of processors 202. For example, a generated parameter may be keying data.

Key-based cryptographic schemes include some manner of generating keys, where such a manner can range from simple or arbitrary to complex, in whole or in part. For example, key generation in asymmetric schemes can be relatively complex, as key pairs can be required to relate to each other according to complex mathematics.

Also, for example, as described in U.S. patent application Ser. No. 09/023,672, entitled "Cryptographic Key Split Combiner," a key generator can include plural key split generators, which generate respective key splits based on seed data, by, for example, mathematically binding or randomizing together plural key splits to provide a key. Or, a key split generator can simply include a randomizer and/or a binder for randomizing and/or binding together key splits.

For example, a random split generator can generate a random key split based on reference data. The random split generator can generate a random or pseudo-random sequence based on reference data, chronological data, or reference and static data, which may be updated. For example, updating static data can be by modifying a prime number divisor of the static data. Other key split generators can include, for example, a token split generator for generating a token key split based on label data and/or organization data and/or static data; a console split generator for generating a console key split based on maintenance data, whether previous or current, and/or on static data; a biometric split generator for generating a biometric key split based on biometric data, which can include biometric data vectors and on biometric combiner data, and/or static data. Label data may be read from a storage medium, and may include user authorization data. A location key split generator can generated a location key split based on real or virtual location data, such as for example, Global Position Satellite ("GPS") data, an Internet Protocol address. The resulting cryptographic key may be, for example, a stream of symbols, at least one symbol block, or a key matrix.

Figure 3:
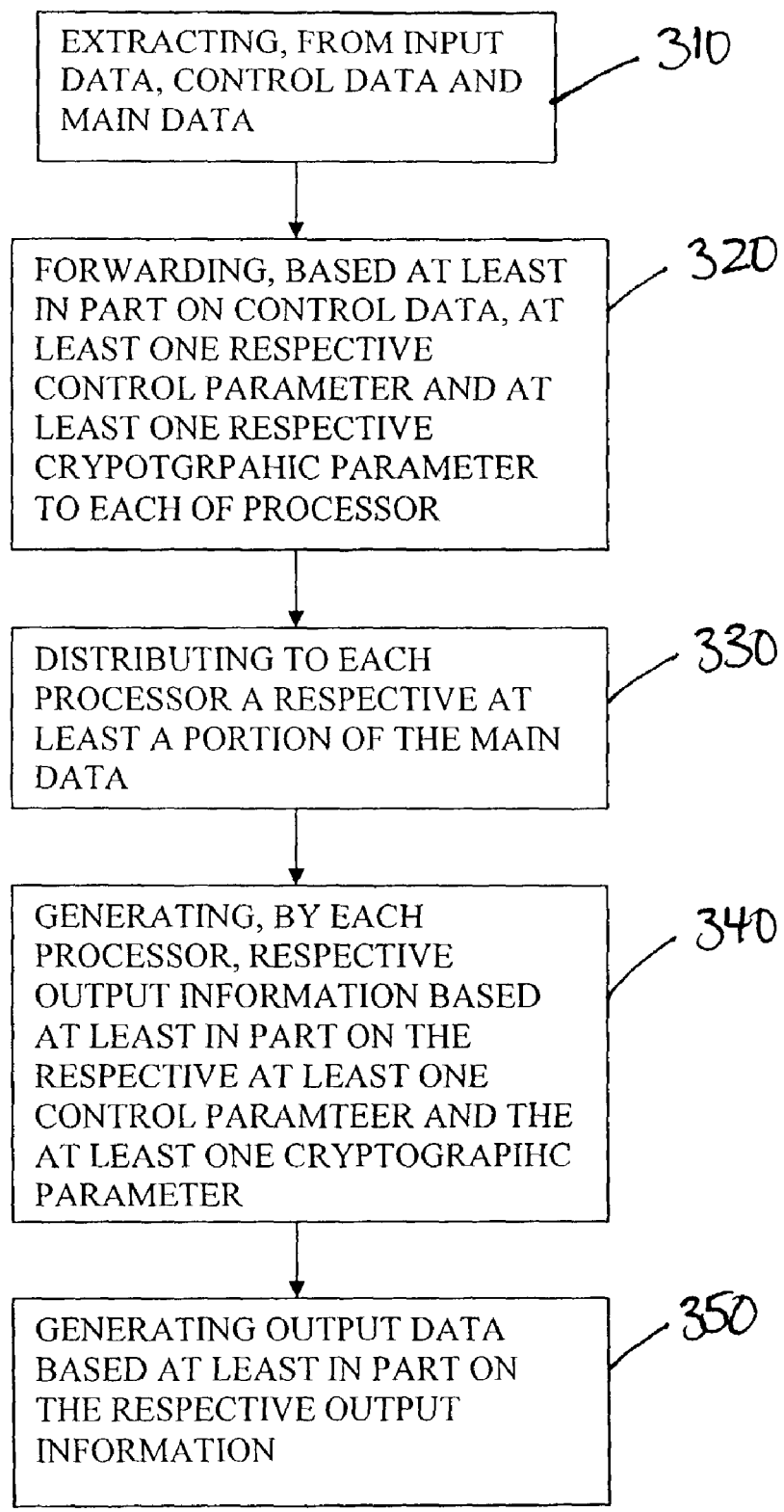
FIG. 3 illustrates an exemplary method according to another exemplary embodiment of the present invention.

FIG. 3 illustrates an exemplary method, according to another exemplary embodiment of the present invention, of cryptographically processing input data in a system comprising a parallel processor array having a plurality of processors. As shown in FIG. 3, such a method can include the following acts: extracting, from the input data, control data and main data (310); forwarding, based at least in part on the control data, at least one respective control parameter and at least one respective cryptographic parameter to each of the plurality of processors (320); distributing to each of the plurality of processors a respective at least a portion of the main data (330); generating, by each of the plurality of processors, respective output information based at least in part on the at least one respective control parameter and the at least one respective cryptographic parameter (340); and generating output data based at least in part on the respective output information (350), where the output data is a cryptographic processing result.

In another exemplary aspect of the invention, the method can further include an act of providing state data representative of a state of the processor array.

In a further exemplary aspect of the invention, the main data can be encrypted data, while the output data can be decrypted data. Alternatively, the main data can be unencrypted data and the output data can be encrypted data. In still yet another exemplary aspect of the invention, each respective at least a portion of the main data can be a multiplexed process stream.

In another exemplary aspect of the invention, the method can further include an act of initializing, by each of the plurality of processors, based at least in part on the at least one respective control parameter. Alternatively, or in addition, the method can further include an act of performing, by each of the plurality of processors, a cryptographic function based at least in part on the at least one respective cryptographic parameter.

In still yet another exemplary aspect of the invention, the at least one respective cryptographic parameter can be keying data.

Referring again to FIGS. 1 and 2, in still yet a further exemplary aspect of the invention, a control parameter 121 can determine which one or more processors of the processors 102 is to be used in a particular cryptographic routine. Thus, selective utilization of particular processors can extend system security. Additionally, input data 101 can further include application data, which identifies the identity or class of application associated with main data 112. Accordingly, selective utilization of processors can associated with the identity or class of application for which the cryptographic routine is needed.

In the foregoing specification, the invention has been described with reference to specific embodiments thereof. It will, however, be evident that various modifications and/or changes may be made thereto without departing from the broader spirit and scope of the invention. Accordingly, the specification and drawings are to be regarded in an illustrative and enabling, rather than a restrictive, sense.

We claim:

1. A system for cryptographic processing of input data on a parallel processor array that includes a plurality of processors, comprising:
 a format filter adapted to extract control data and main data from the input data;
 a control unit adapted to receive the control data from said format filter, and to forward, based at least in part on the control data, at least one respective control parameter and at least one respective cryptographic parameter to each of the plurality of processors;
 a first distributor adapted to receive the main data from said format filter, and to distribute to each of the plurality of processors a respective at least a portion of the main data;
 a second distributor adapted to receive respective output information from each of the plurality of processors, and to generate, based at least in part on the respective output information, output data;
 wherein each of the plurality of processors is adapted to generate its respective output information based at least in part on the control parameters and the cryptographic parameters, and the output data is a cryptographic processing result.

2. The system of claim 1, wherein said control unit is further adapted to provide state data representative of a state of the processor array.

3. The system of claim 1, wherein the main data is encrypted data and the output data is decrypted data.

4. The system of claim 1, wherein the main data is unencrypted data and the output data is encrypted data.

5. The system of claim 1, wherein each respective at least a portion of the main data is a multiplexed process stream.

6. The system of claim 1, wherein each of the plurality of processors is adapted to initialize based at least in part on the at least one respective control parameter received from the control unit.

7. The system of claim 1, wherein each of the plurality of processors is adapted to perform a cryptographic function based at least in part on the at least one respective cryptographic parameter received from the control unit.

8. The system of claim 1, wherein the at least one respective cryptographic parameter is keying data.

9. The system of claim 1, wherein at least one of the first distributor and the second distributor is a switching matrix.

10. In a system comprising a parallel processor array having a plurality of processors, a method of cryptographically processing input data, comprising:

extracting, from the input data, control data and main data;

forwarding, based at least in part on the control data, at least one respective control parameter and at least one respective cryptographic parameter to each of the plurality of processors;

distributing to each of the plurality of processors a respective at least a portion of the main data;

generating, by each of the plurality of processors, respective output information based at least in part on the at least one respective control parameter and the at least one respective cryptographic parameter; and generating output data based at least in part on the respective output information;

wherein the output data is a cryptographic processing result.

11. The method of claim 10, further comprising
providing state data representative of a state of the processor array.

12. The method of claim 10, wherein the main data is encrypted data and the output data is decrypted data.

13. The method of claim 10, wherein the main data is unencrypted data and the output data is encrypted data.

14. The method of claim 10, wherein each respective at least a portion of the main data is a multiplexed process stream.

15. The method of claim 10, further comprising
initializing, by each of the plurality of processors, based at least in part on the at least one respective control parameter.

16. The method of claim 10, further comprising
performing, by each of the plurality of processors, a cryptographic function based at least in part on the at least one respective cryptographic parameter.

17. The method of claim 10, wherein the at least one respective cryptographic parameter is keying data.

18. The method of claim 10, wherein at least one of distributing to each of the plurality of processors a respective at least a portion of the main data and generating output data based at least in part on the respective output information is performed by a switching matrix.

* * * * *